US012559005B2

(12) United States Patent
Nagatani

(10) Patent No.: US 12,559,005 B2
(45) Date of Patent: Feb. 24, 2026

(54) VEHICLE SEAT WITH RECLINER BRACKET

(71) Applicant: TOYOTA BOSHOKU KABUSHIKI KAISHA, Aichi (JP)

(72) Inventor: Yuki Nagatani, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 167 days.

(21) Appl. No.: 18/376,659

(22) Filed: Oct. 4, 2023

(65) Prior Publication Data

US 2024/0116414 A1 Apr. 11, 2024

(30) Foreign Application Priority Data

Oct. 7, 2022 (JP) ................................. 2022-162733

(51) Int. Cl.
*B60N 2/42* (2006.01)
*B60N 2/20* (2006.01)
(52) U.S. Cl.
CPC *B60N 2/42* (2013.01); *B60N 2/20* (2013.01)
(58) Field of Classification Search
CPC ................................................ B60N 2/42709
See application file for complete search history.

(56) References Cited

U.S. PATENT DOCUMENTS 10,259,358 B2 * 4/2019 Mizobata ............. B60N 2/4228
10,752,138 B2 8/2020 Baba et al.

12,319,181 B2 * 6/2025 Kondo ................... B60N 2/682
2015/0091346 A1 * 4/2015 Kitou ................. B60N 2/42709
297/216.14
2018/0339613 A1 11/2018 Mizobata
2020/0070689 A1 * 3/2020 Naik .................... B60N 2/2252
2021/0138945 A1 * 5/2021 Yamaguchi ............ B60N 2/682
(Continued)

FOREIGN PATENT DOCUMENTS

| CN | 111204264 | A | * | 5/2020 | |
| CN | 215097149 | U | | 12/2021 | |
| DE | 102011086650 | A1 | * | 5/2013 | ........... B60N 2/0705 |

(Continued)

OTHER PUBLICATIONS

Japanese Office Action in counterpart Japanese Patent Application No. 2022-162733, issued on Nov. 25, 2025, and its English translation.

*Primary Examiner* — Joshua J Michener
(74) *Attorney, Agent, or Firm* — Greenblum & Bernstein, P.L.C.

(57) ABSTRACT

One aspect of the present disclosure is a vehicle seat including a lower arm fixed to a cushion frame, and a recliner coupled to a back frame and to the lower arm and configured to cause the back frame to pivot relative to the lower arm. The lower arm includes a recliner plate. The recliner plate includes an impact absorbing hole located in a position lower than a rotational center-axis of the recliner, a first bead extending from the impact absorbing hole to the seat rear side and curved so as to protrude along a thickness of the recliner plate, and a second bead extending from the impact absorbing hole to a seat front side and curved so as to protrude along the thickness of the recliner plate. A protruding direction of the second bead is opposite to a protruding direction of the first bead.

7 Claims, 6 Drawing Sheets

(56) References Cited

U.S. PATENT DOCUMENTS

2025/0262996 A1 * 8/2025 Matsui .............. B60N 2/42709

FOREIGN PATENT DOCUMENTS

DE      202018107311 U1 * 4/2019   .......... B60N 2/4228
JP          2018199383 A    12/2018
WO    WO-2006093644 A1 * 9/2006   ......... B60N 2/42709
WO    WO-2012160341 A2 * 11/2012  .............. B60N 2/24

* cited by examiner

RIGHT ← UP → REAR
FRONT ← → LEFT
DOWN

VEHICLE SEAT WITH RECLINER BRACKET

CROSS-REFERENCE TO RELATED APPLICATIONS

This application claims the benefit of Japanese Patent Application No. 2022-162733 filed on Oct. 7, 2022 with the Japan Patent Office, the disclosure of which is incorporated herein by reference.

BACKGROUND

The present disclosure relates to a vehicle seat.

U.S. patent Ser. No. 10/752,138 discloses a vehicle seat to be arranged in a vehicle, such as an automobile. The vehicle seat is provided with a recliner between a back frame and a lower arm coupled to a cushion frame, in order to allow a seatback to pivot relative to a seat cushion.

SUMMARY

In a vehicle seat including a lower arm to which a recliner is attached, a load to a back frame that occurs at a vehicle collision is transmitted to a recliner as a torque. If the torque is continuously input to the recliner, it may damage the recliner and cause occurrence of damage or the like to a joint part of the recliner and the back frame. As the result, the back frame may be tilted.

In one aspect of the present disclosure, it is desirable to provide a vehicle seat that can reduce a torque applied to a recliner at a collision.

One aspect of the present disclosure is a vehicle seat comprising a seat cushion, a seatback pivotable relative to the seat cushion in seat front-rear directions, a cushion frame supporting the seat cushion, a back frame supporting the seatback, a lower arm fixed to the cushion frame, and a recliner coupled to the back frame and to the lower arm and configured to cause the back frame to pivot relative to the lower arm in the seat front-rear directions.

The lower arm comprises a recliner plate having a plate shape, to which the recliner is fixed and which is fixed to the cushion frame. The recliner plate comprises an impact absorbing hole located in a position lower than a rotational center-axis of the recliner, a first bead extending from the impact absorbing hole to the seat rear side and curved so as to protrude along a thickness of the recliner plate, and a second bead extending from the impact absorbing hole to a seat front side and curved so as to protrude along the thickness of the recliner plate. A protruding direction of the second bead is opposite to a protruding direction of the first bead.

With the above-described configuration, a load transmitted to the cushion frame from the recliner, to which a torque is input, induces a distortion that causes the first bead and the second bead protruding in the directions opposite to each other to deform in the respective seat width directions.

As a result, the damage to the recliner is inhibited, and deformation of the cushion frame is inhibited. Further, a distortion that occurs in coupling the recliner and the back frame is absorbed by the impact absorbing hole, which inhibits the coupled part of the recliner and the back frame from being damaged at occurrence of a torque input to the recliner.

In one aspect of the present disclosure, the first bead may protrude in a direction approaching the back frame in the seat width directions. With the above-described configuration, the second bead disposed on the seat front side relative to the first bead protrudes in a direction away from the back frame, thus making it easier to avoid interference between the recliner plate and the back frame.

In one aspect of the present disclosure, as viewed from a direction parallel to the rotational center-axis of the recliner, a longitudinal direction of the first bead may intersect a longitudinal direction of the second bead. The above-described configuration causes deformation speeds in the first bead and the second bead to decrease. Accordingly, an impact absorbing effect in the recliner plate can be improved.

In one aspect of the present disclosure, a seat front end of the second bead may be positioned on the seat front side relative to a joint portion of the recliner and the recliner plate. With the above-described configuration, it is possible to inhibit the distortion that occurs when the torque is input to the recliner from being transmitted to the joint portion. Accordingly, damage can be inhibited at the joint portion.

In one aspect of the present disclosure, the recliner plate may comprise two or more fixation portions fixed to the cushion frame. As viewed from the direction parallel to the rotational center-axis of the recliner, the impact absorbing hole may be located in a position between the rotational center-axis of the recliner and one of the two or more fixation portions located in a lowest position. The above-described configuration allows the impact absorbing hole to be located on a load transmission path from the recliner to the cushion frame, and thus an impact absorbing effect in the recliner plate can be improved.

In one aspect of the present disclosure, the recliner may be superposed on the back frame from an outside in seat width directions. The cushion frame may comprise an inclined portion facing the recliner in up-down directions and having a top surface inclined such that a height thereof decreases toward an inside in the seat width directions. With the above-described configuration, the back frame sunk due to deformation of the recliner plate slides together with the recliner along the inclined portion, which allows the back frame to move down to the inside in the seat width directions. As a result, interference between the back frame and the cushion frame can be inhibited.

In one aspect of the present disclosure, the cushion frame may comprise a side frame to which the lower arm is fixed, and a reinforcing plate superposed on the side frame in the seat width directions. The inclined portion may be provided on the reinforcing plate. The above-described configuration can increase in a degree of freedom in design of the side frame.

BRIEF DESCRIPTION OF THE DRAWINGS

An example embodiment of the present disclosure will be described hereinafter by way of example with reference to the accompanying drawings, in which.

DETAILED DESCRIPTION OF EXEMPLARY EMBODIMENTS

1. First Embodiment 1-1. Configuration

Figure 1:
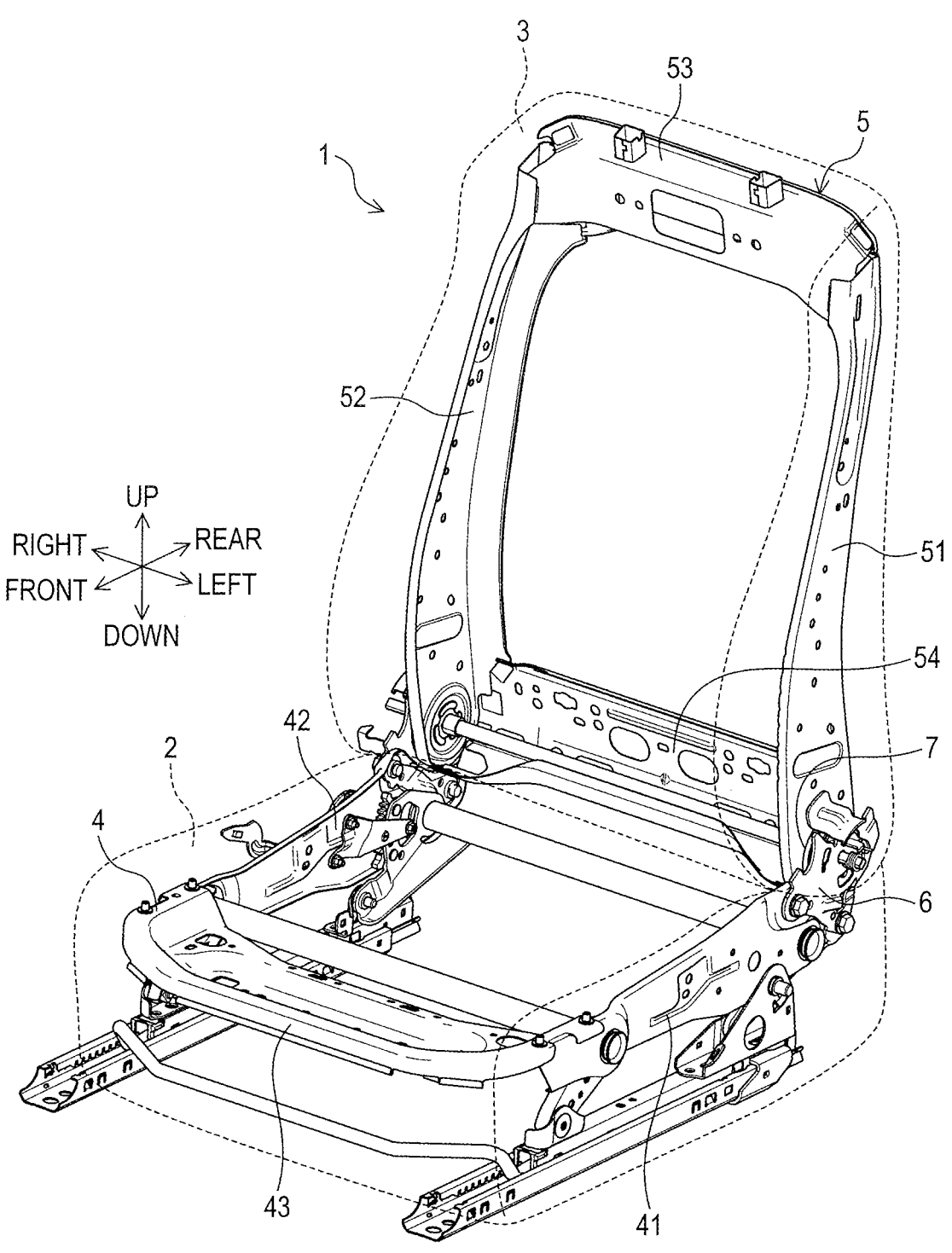
FIG. 1 is a schematic perspective view of a vehicle seat of one embodiment.

A vehicle seat 1 shown in FIG. 1 comprises a seat cushion 2, a seatback 3, a cushion frame 4, a back frame 5, a lower arm 6, and a recliner 7.

The vehicle seat 1 is used as a seat for a passenger car. It is to be noted that directions in the description below and the drawings indicate respective directions in a state where the vehicle seat 1 is assembled in a vehicle (for example, a passenger car). In the present embodiment, seat width directions correspond to left-right directions of the vehicle, and a seat front side corresponds to a front side of the vehicle.

The seat cushion 2 is a portion to support buttocks of an occupant. The seatback 3 is a portion to support a back of the occupant. The seatback 3 is pivotable in seat front-rear directions relative to the seat cushion 2.

<Cushion Frame>

The cushion frame 4 supports the seat cushion 2. The cushion frame 4 comprises a first side frame 41, a second side frame 42, and a front panel 43.

The first side frame 41 and the second side frame 42 each are panel-like members formed to extend in the seat front-rear directions and are arranged to be spaced apart from each other in the seat width directions. The first side frame 41 is arranged on the left relative to the second side frame 42.

A thickness direction (or a thickness) of the first side frame 41 and the second side frame 42 is parallel to the seat width directions. The front panel 43 is arranged to bridge over a front end portion of the first side frame 41 and a front end portion of the second side frame 42.

<Back Frame>

The back frame 5 supports the seatback 3, and is pivotable together with the seatback 3 in the seat front-rear directions. The back frame 5 comprises a third side frame 51, a fourth side frame 52, an upper panel 53, and a lower panel 54.

The third side frame 51 and the fourth side frame 52 are formed to extend in up-down directions, and arranged to be spaced apart from each other in the seat width directions. The third side frame 51 is arranged on the left relative to the fourth side frame 52. A thickness direction (or a thickness) of the third side frame 51 and the fourth side frame 52 is parallel to the seat width directions.

The upper panel 53 couples an upper end portion of the third side frame 51 and an upper end portion of the fourth side frame 52 in the seat width directions. The lower panel 54 couples the third side frame 51 and the fourth side frame 52 in a position lower than the upper panel 53 in the seat width directions.

<Lower Arm>

The lower arm 6 is a plate-shaped frame fixed to the first side frame 41 of the cushion frame 4.

The lower arm 6 is coupled to a lower end portion of the third side frame 51 of the back frame 5 via the recliner 7. In other words, the third side frame 51 is coupled to the cushion frame 4 by the lower arm 6. The lower arm 6 is arranged on an outside in the seat width directions relative to the first side frame 41 and the third side frame 51. The lower arm 6 will be described in details below.

<Recliner>

The recliner 7 is coupled to the third side frame 51 of the back frame 5 and to the lower arm 6. The recliner 7 is superposed on the third side frame 51 from the outside in the seat width directions.

Figure 2:
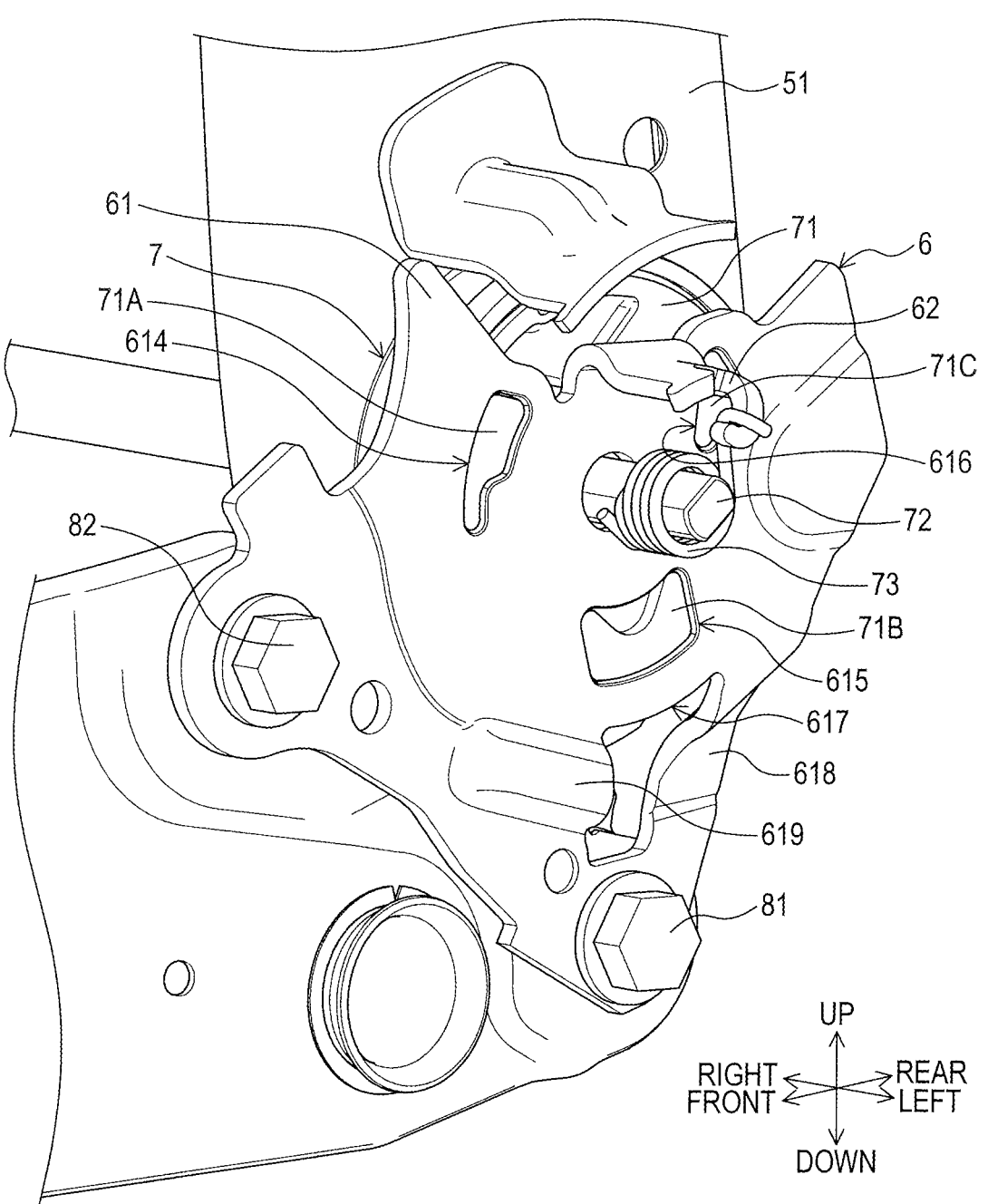
FIG. 2 is a schematic perspective view of a coupled area of a cushion frame, a back frame, a lower arm, and a recliner in the vehicle seat of FIG. 1.

The recliner 7 is a known device configured to cause the back frame 5 to pivot relative to the lower arm 6 and the cushion frame 4 in the seat front-rear directions. The recliner 7 causes the back frame 5 to pivot on a rotational center-axis parallel to the seat width directions. As shown in FIG. 2, the recliner 7 comprises a recliner body 71, an operation pin 72, and a return spring 73.

The recliner body 71 comprises a first joint portion 71A, a second joint portion 71B, and a third joint portion 71C. The first joint portion 71A, the second joint portion 71B, and the third joint portion 71C are protrusions each protruding toward the outside in the seat width directions, and are inserted into respective ones of a first opening 614, a second opening 615, and a third opening 616, which are provided on the lower arm 6. The first joint portion 71A, the second joint portion 71B, and the third joint portion 71C are joined to the lower arm 6 by welding.

The recliner body 71 comprises a locking mechanism that switches presence or absence of a restriction on the pivot of the third side frame 51. Switching the locking of the recliner body 71 is controlled by rotation of the operation pin 72. The operation pin 72 is axially rotated, for example, by an input from an operation lever (not shown) coupled to the operation pin 72.

The return spring 73 is attached to the operation pin 72. One end of the return spring 73 is fixed to the operation pin 72. The other end of the return spring 73 is fixed to an engaging portion 62 of the lower arm 6.

The return spring 73 biases the operation pin 72 in a direction of locking the recliner body 71. Accordingly, when the input to the operation pin 72 is released, the operation pin 72 rotates in the direction of locking the recliner body 71.

In the present embodiment, components corresponding to the lower arm 6 and the recliner 7 are also provided between the second side frame 42 of the cushion frame 4 and the fourth side frame 52 of the back frame 5 shown in FIG. 1.

<Features of Lower Arm>

Figure 3A:
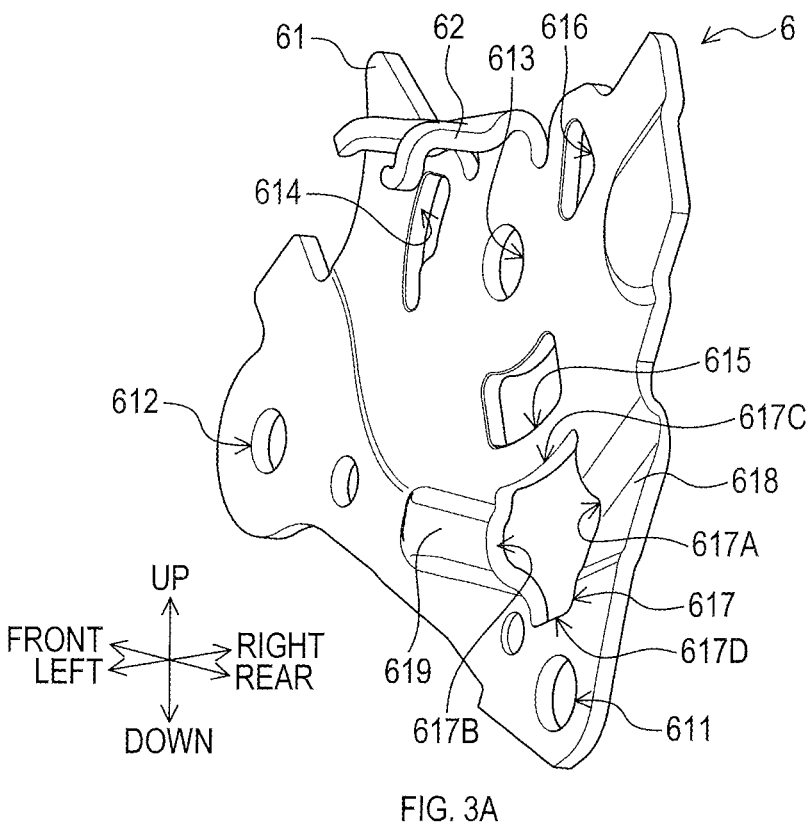
FIG. 3A is a schematic perspective view of the lower arm of FIG. 2.
Figure 3B:
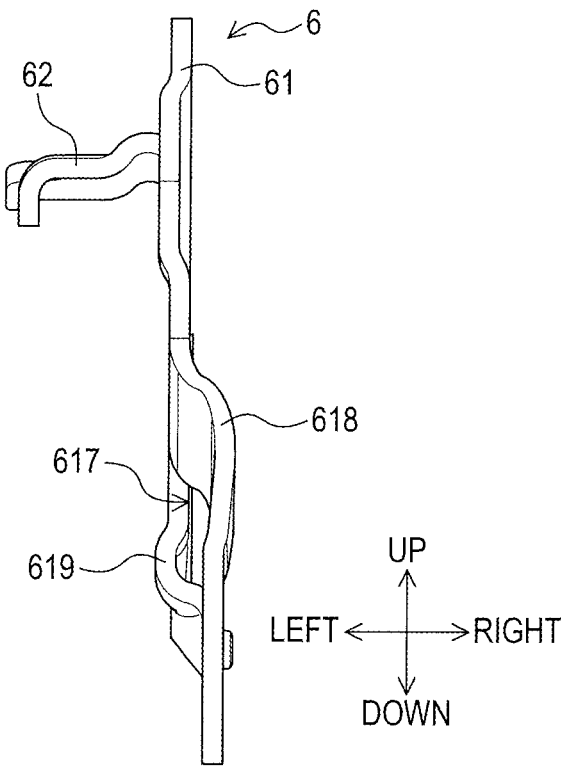
FIG. 3B is a schematic rear view of the lower arm of FIG. 3A.

As shown in FIG. 3A and FIG. 3B, the lower arm 6 comprises a recliner plate 61 and the engaging portion 62.

[Recliner Plate]

The recliner plate 61 is a planar portion to which the recliner 7 is fixed. The recliner plate 61 is arranged to overlap with the recliner body 71 from the outside in the seat width directions. A thickness direction (or a thickness) of the recliner plate 61 is parallel to the seat width directions.

The recliner plate 61 comprises a first fixation portion 611, a second fixation portion 612, an insertion hole 613, the first opening 614, the second opening 615, the third opening 616, an impact absorbing hole 617, a first bead 618, and a second bead 619.

[Fixation Portion]

The first fixation portion 611 and the second fixation portion 612 are holes into which the first bolt 81 and the second bolt 82 (see FIG. 2) are inserted, respectively. The first bolt 81 and the second bolt 82 are tightened to connect the recliner plate 61 to the first side frame 41, respectively.

In other words, the recliner plate 61 is fixed to the cushion frame 4 at the first fixation portion 611 and the second fixation portion 612.

The first fixation portion 611 is located in a position lower than the second fixation portion 612 and on a seat rear side relative to the second fixation portion 612. Also, the first fixation portion 611 is located in a position lower than the impact absorbing hole 617, the first bead 618, and the second bead 619.

[Insertion Hole and Opening]

The insertion hole 613 is positioned to be surrounded by the first opening 614, the second opening 615, and the third opening 616. The insertion hole 613 overlaps with the recliner 7 in the seat width directions. The operation pin 72 is inserted into the insertion hole 613.

The first joint portion 71A of the recliner body 71 is inserted into and joined to the first opening 614. The second joint portion 71B of the recliner body 71 is inserted into and joined to the second opening 615. The third joint portion 71C of the recliner body 71 is inserted into and joined to the third opening 616.

The first opening 614 is positioned on the seat front side relative to the insertion hole 613, and is at the foremost location in the seat front side among the three openings 614, 615, 616. The second opening 615 is located in the position lower than the insertion hole 613. The third opening 616 is positioned on the seat rear side relative to the insertion hole 613, and is at the rearmost location in the seat rear side among the three openings 614, 615, 616.

[Impact Absorbing Hole]

The impact absorbing hole 617 is an opening provided in an area of the recliner plate 61 that is located in a position lower than the insertion hole 613 and the second opening 615 and upper than the first fixation portion 611.

Figure 4:
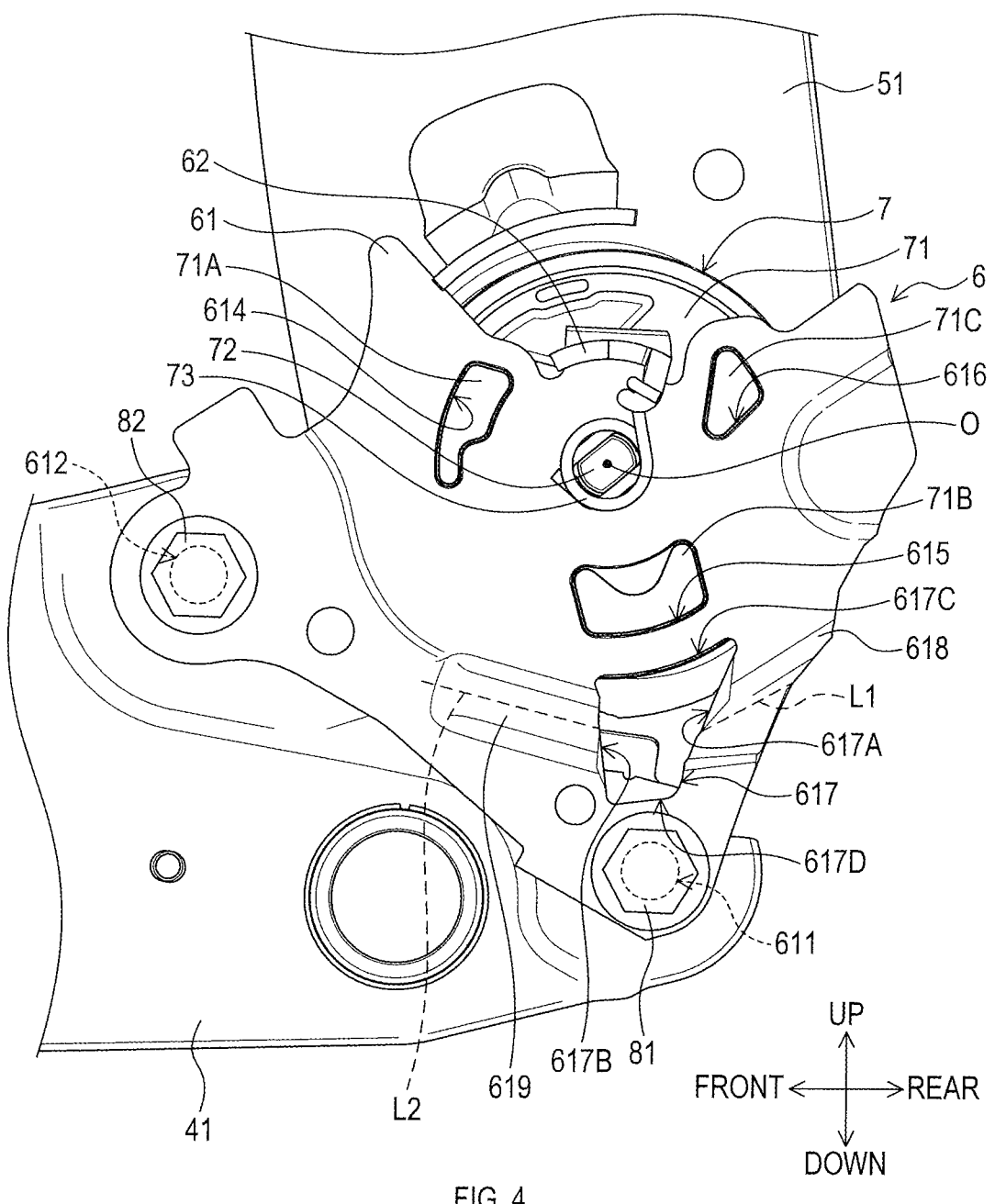
FIG. 4 is a schematic right side view of the lower arm and the recliner of FIG. 2.

As shown in FIG. 4, the impact absorbing hole 617 is located in a position lower than a rotational center-axis O of the recliner 7. Specifically, as viewed from a direction parallel to the rotational center-axis O of the recliner 7 (that is, the seat width directions), the impact absorbing hole 617 is located in a position between the rotational center-axis O of the recliner 7 and the first fixation portion 611, which is located in the lowest position of the first fixation portion 611 and the second fixation portion 612.

The rotational center-axis O of the recliner 7, the second joint portion 71B of the recliner body 71, the impact absorbing hole 617, and the first bolt 81 (that is, the first fixation portion 611) are arranged in order from up to down.

The impact absorbing hole 617 comprises a first edge 617A, a second edge 617B, an upper protruding part 617C, and a lower protruding part 617D. The first bead 618 is connected to the first edge 617A. The first edge 617A is configured as a portion of a rear edge of the impact absorbing hole 617. The second bead 619 is connected to the second edge 617B. The second edge 617B is configured as a portion of a front edge of the impact absorbing hole 617.

The upper protruding part 617C is an upward protruding space upper than the first edge 617A and the second edge 617B. The upper protruding part 617C is opposite to the second opening 615 in the up-down directions. The lower protruding part 617D is a downward protruding space lower than the first edge 617A and the second edge 617B. The lower protruding part 617D is opposite to the first fixation portion 611 in the up-down directions.

The impact absorbing hole 617 is formed such that a width thereof in the seat front-rear directions decreases downward. In other words, a distance between the first edge

617A and the second edge 617B in the seat front-rear directions decreases downward.

[First Bead]

The first bead 618 is a convex part linearly extending from the impact absorbing hole 617 to the seat rear side and a seat upper side. Specifically, the first bead 618 extends from the first edge 617A of the impact absorbing hole 617 to a rear end of the recliner plate 61.

The first bead 618 is located in a position upper than the first fixation portion 611 and lower than the insertion hole 613, the first opening 614, and the third opening 616. A portion of a seat rear end of the first bead 618 is located in the position upper than the impact absorbing hole 617, and also overlaps with the second opening 615 in the seat front-rear directions.

As shown in FIG. 3A and FIG. 3B, the first bead 618 protrudes in the thickness direction of the recliner plate 61. Specifically, the first bead 618 protrudes to an inside in the seat width directions (i.e., right side), and is curved so as to be compressively deformable in the up-down directions. In other words, the first bead 618 protrudes in a direction approaching the third side frame 51 of the back frame 5 in the seat width directions.

As shown in FIG. 4, a longitudinal direction of the first bead 618 (i.e., a direction along a center line L1) intersects the up-down directions and extends so as to connect the impact absorbing hole 617 and the rear end of the recliner plate 61.

[Second Bead]

The second bead 619 is a ridge part linearly extending from the impact absorbing hole 617 to the seat front side and the seat upper side. Specifically, the second bead 619 extends from the second edge 617B of the impact absorbing hole 617, to a position between the first fixation portion 611 and the second fixation portion 612.

The second bead 619 is located in a position upper than the first fixation portion 611, and lower than the insertion hole 613, the first opening 614, the second opening 615, and the third opening 616. A seat front end of the second bead 619 is positioned on the seat front side relative to the first joint portion 71A, the second joint portion 71B, and the third joint portion 71C (in other words, the first opening 614, the second opening 615, and the third opening 616). In addition, the seat front end of the second bead 619 is separated from an end face of the recliner plate 61.

As shown in FIG. 3A and FIG. 3B, the second bead 619 protrudes in the thickness direction of the recliner plate 61. A protruding direction of the second bead 619 is a direction toward the outside in the seat width directions (i.e., left side), and is opposite to a protruding direction of the first bead 618. Like the first bead 618, the second bead 619 is curved so as to be compressively deformable in the up-down directions.

As shown in FIG. 4, a longitudinal direction of the second bead 619 (i.e., a direction along a center line L2) intersects the up-down directions. As viewed from the direction parallel to the rotational center-axis O of the recliner 7, the longitudinal direction of the first bead 618 intersects (that is, is not parallel to) the longitudinal direction of the second bead 619. Also, a length of the second bead 619 along the center line L2 is greater than a length of the first bead 618 along the center line L1.

As shown in FIG. 3B, a lower area of the recliner plate 61 than the first bead 618 and the second bead 619 (in other words, an area including the first fixation portion 611) is offset to the inside in the seat width directions, with respect to an upper area of the recliner plate 61 than the first bead 618 and the second bead 619 (in other words, an area including the insertion hole 613, the first opening 614, the second opening 615, and the third opening 616).

[Engaging Portion]

The engaging portion 62 protrudes from an upper end portion of the recliner plate 61 to the outside in the seat width directions. The return spring 73 is attached to the engaging portion 62.

<Reinforcing Plate>

Figure 5A:
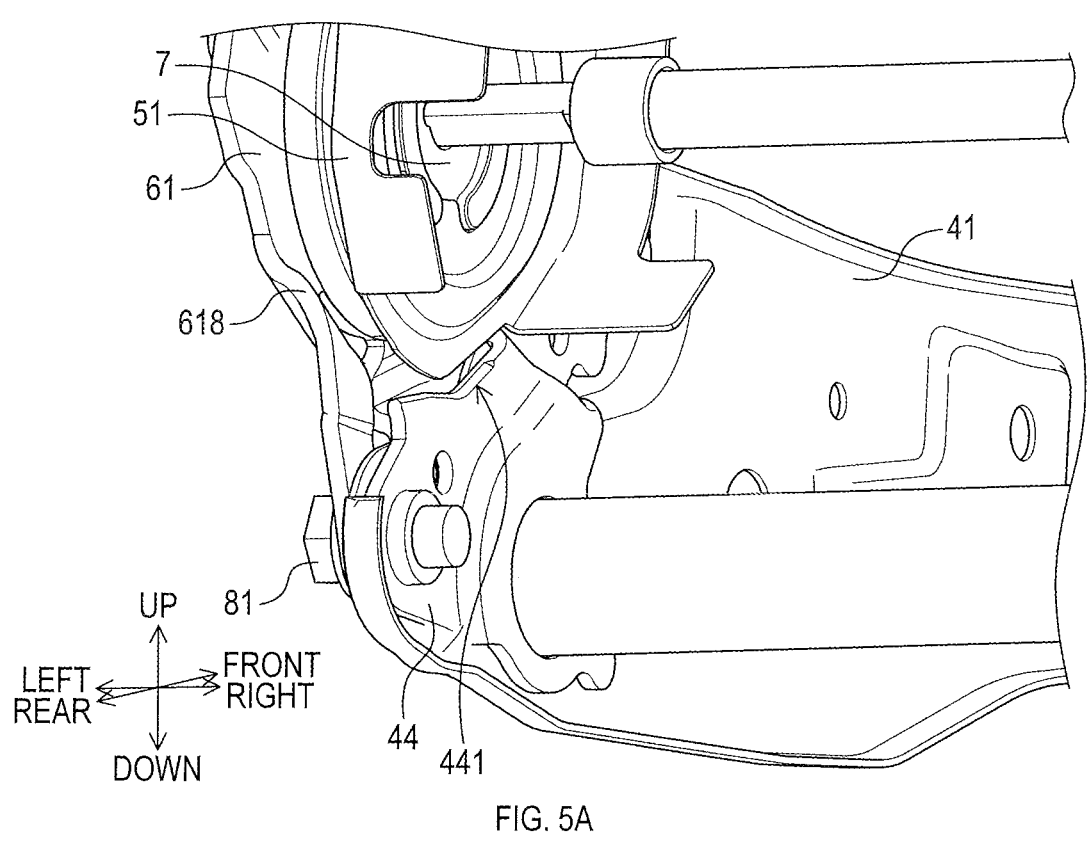
FIG. 5A is a schematic perspective view of the coupled area of FIG. 2.
Figure 5B:
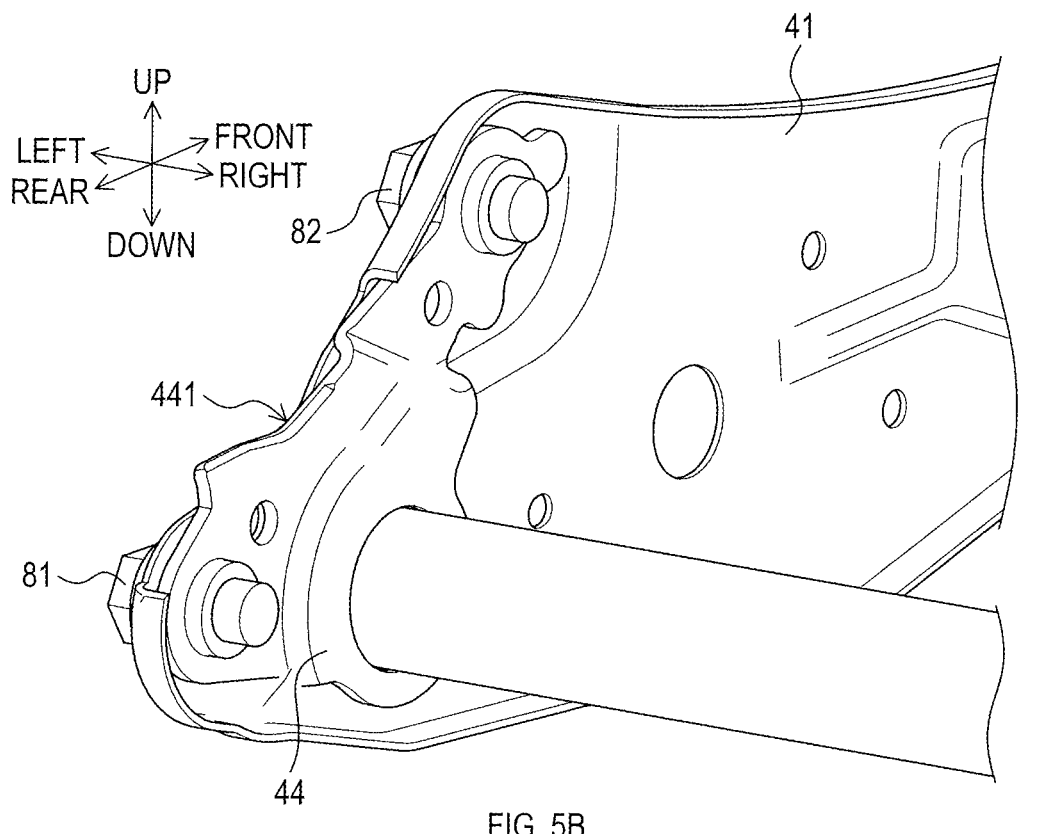
FIG. 5B is a schematic perspective view of the cushion frame of FIG. 5A.

As shown in FIG. 5A and FIG. 5B, the cushion frame 4 comprises a reinforcing plate 44 superposed on the first side frame 41 in the seat width directions. In FIG. 5B, the third side frame 51, the lower arm 6, and the recliner 7 are omitted.

The reinforcing plate 44 is superposed on a rear end of the first side frame 41 from the inside in the seat width directions, and fixed to the first side frame 41, for example, by welding. The first bolt 81 and the second bolt 82 that fix the recliner plate 61 to the first side frame 41 are inserted through the reinforcing plate 44.

The reinforcing plate 44 comprises an inclined portion 441. The inclined portion 441 is disposed in an upper end portion of the reinforcing plate 44, and faces the recliner 7 in the up-down directions. Specifically, the inclined portion 441 is arranged directly below the recliner 7.

The inclined portion 441 has a top surface inclined such that a height of the top surface decreases toward the inside in the seat width directions. In other words, the top surface of the inclined portion 441 is inclined so as to guide a member colliding from above with the inclined portion 441 (that is, the recliner 7) toward the inside in the seat width directions.

1-2. Effects

With the embodiments described in detail above, the following effects can be obtained.

(1a) The load transmitted to the cushion frame 4 from the recliner 7, to which a torque is input, induces a distortion that causes the first bead 618 and the second bead 619 protruding in the directions opposite to each other to deform in the respective seat width directions.

As a result, damage to the recliner 7 is inhibited, and deformation of the cushion frame 4 is inhibited. Further, a distortion that has occurred in coupling the recliner 7 and the back frame 5 is absorbed by the impact absorbing hole 617, which inhibits the coupled part of the recliner 7 and the back frame 5 from being damaged at occurrence of a torque input to the recliner 7.

(1b) The first bead 618 protrudes in the direction approaching the back frame 5 in the seat width directions, which causes the second bead 619 disposed on the seat front side relative to the first bead 618 to protrude in a direction away from the back frame 5. Accordingly, it is easier to avoid interference between the recliner plate 61 and the back frame 5.

(1c) The longitudinal direction of the first bead 618 intersects the longitudinal direction of the second bead 619, so that deformation speeds in the first bead 618 and the second bead 619 decrease. Accordingly, an impact absorbing effect in the recliner plate 61 can be improved.

(1d) The seat front end of the second bead 619 is positioned on the seat front side relative to the joint portions 71A, 71B, 71C, so that it is possible to inhibit the distortion that occurs when a torque is input to the recliner 7 from being transmitted to the joint portions 71A, 71B, 71C. Accordingly, damage can be inhibited at the joint portions 71A, 71B, 71C.

(1e) The impact absorbing hole 617 is located in the position between the rotational center-axis of the recliner 7 and the first fixation portion 611, so that the impact absorbing hole 617 is located on the load transmission path from the recliner 7 to the cushion frame 4. Thus, the impact absorbing effect in the recliner plate 61 can be improved.

(1f) The back frame 5 sunk due to deformation of the recliner plate 61 slides together with the recliner 7 along the inclined portion 441, which allows the back frame 5 to move down to the inside in the seat width directions. As a result, interference between the back frame 5 and the cushion frame 4 can be inhibited.

(1g) The inclined portion 441 is provided on the reinforcing plate 44, which can increase a degree of freedom in design of the first side frame 41.

2. Other Embodiments

Although one embodiment of the present disclosure has been described above, it should be understood that the present disclosure is not limited to the above-described embodiments but may be practiced in various forms.

(2a) In the vehicle seat of the aforementioned embodiment, the first bead may protrude to the outside in the seat width directions, and the second bead may protrude to the inside in the seat width directions. The longitudinal direction of the first bead and the longitudinal direction of the second bead may be parallel to each other.

Figure 6A:
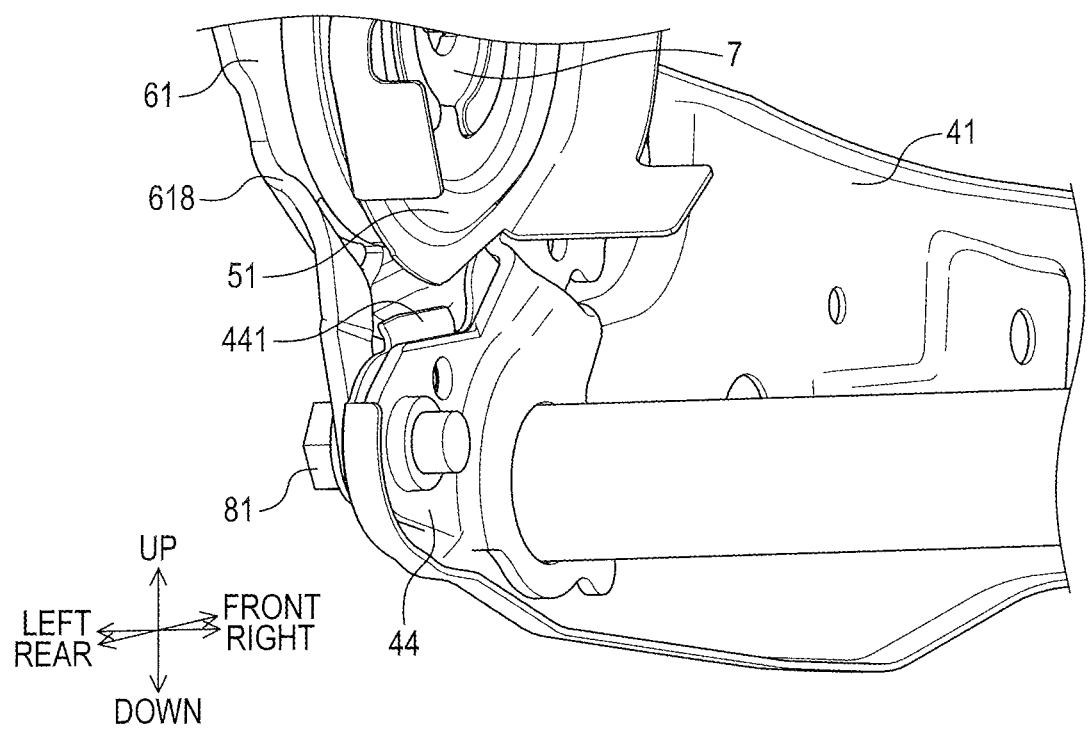
FIG. 6A is a schematic perspective view of a coupled area of an embodiment different from that of FIG. 2.
Figure 6B:
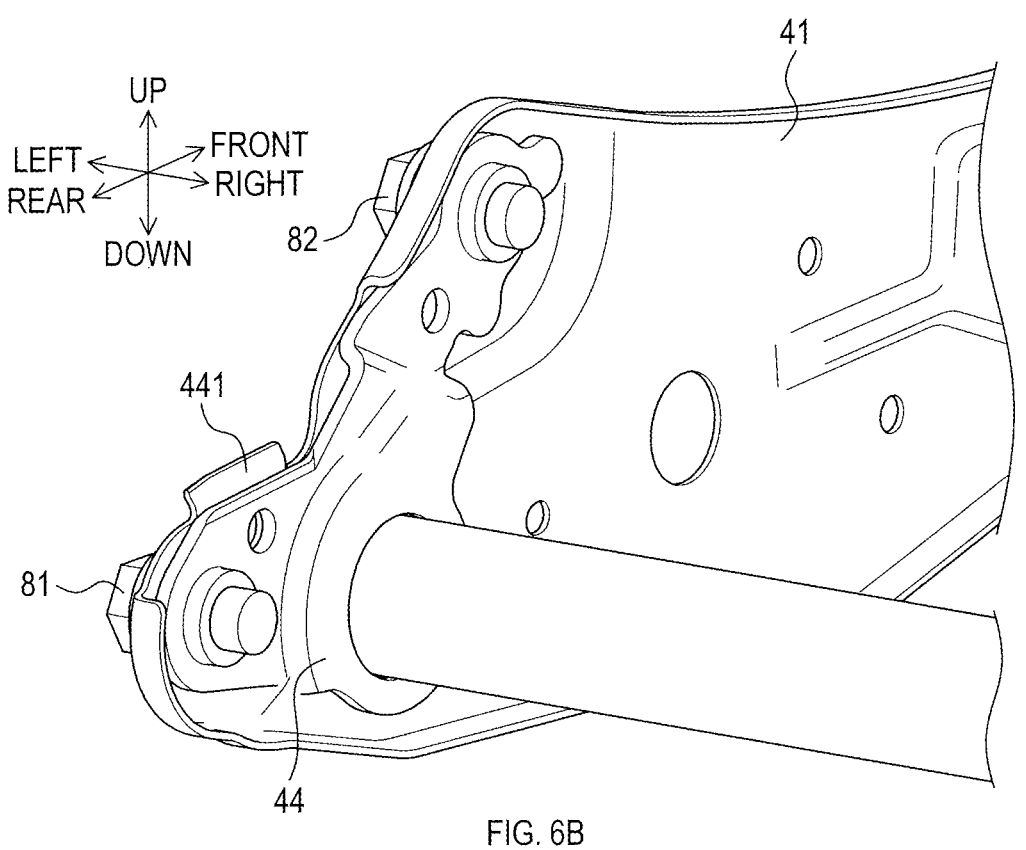
FIG. 6B is a schematic perspective view of the cushion frame of FIG. 6A.

(2b) In the vehicle seat of the aforementioned embodiment, the inclined portion does not have to be necessarily provided on the reinforcing plate. For example, as shown in FIG. 6A and FIG. 6B, the inclined portion 441 may be provided on the first side frame 41. The cushion frame does not have to necessarily comprise the inclined portion.

(2c) The vehicle seat of the aforementioned embodiments may be applied to seats to be used for cars other than passenger cars, or seats to be used for vehicles other than cars, such as railroad vehicles, ships and boats, and aircrafts.

(2d) It may be possible to divide a function performed by one element in the aforementioned embodiments to a plurality of elements, or to integrate functions of a plurality of elements into one element. Also, the configurations in the aforementioned embodiments may be partly omitted. Further, at least a portion of a configuration in the aforementioned embodiments may be added to, or may be replaced with another configuration of the aforementioned embodiments. Any form that falls within the scope of the technical ideas defined by the language of the appended claims may be an embodiment of the present disclosure.

What is claimed is:

1. A vehicle seat, comprising:

a seat cushion;

a seatback pivotable relative to the seat cushion in seat front-rear directions;

a cushion frame supporting the seat cushion;

a back frame supporting the seatback;

a lower arm fixed to the cushion frame; and a recliner coupled to the back frame and to the lower arm and configured to cause the back frame to pivot relative to the lower arm in the seat front-rear directions, wherein the lower arm comprises a recliner plate, to which the recliner is fixed and which is fixed to the cushion frame, wherein the recliner plate comprises:

an impact absorbing hole located in a position lower than a rotational center-axis of the recliner;

a first bead extending from the impact absorbing hole to a seat rear side and curved so as to protrude along a seat width direction of the recliner plate in a first protruding direction; and a second bead extending from the impact absorbing hole to a seat front side and curved so as to protrude along the seat width direction of the recliner plate in a second protruding direction, wherein the second protruding direction is opposite to the first protruding direction, and wherein the recliner plate is a one-piece plate.

2. The vehicle seat according to claim 1, wherein the first bead protrudes in a direction approaching the back frame in seat width directions.

3. The vehicle seat according to claim 1, wherein a seat front end of the second bead is positioned on the seat front side relative to a joint portion of the recliner and the recliner plate.

4. The vehicle seat according to claim 1, wherein the recliner plate comprises two or more fixation portions fixed to the cushion frame, and wherein, as viewed from the direction parallel to the rotational center-axis of the recliner, the impact absorbing hole is located in a position between the rotational center-axis of the recliner and one of the two or more fixation portions located in a lowest position.

5. The vehicle seat according to claim 1, wherein the recliner is superposed on the back frame from an outside in the seat width directions, and wherein the cushion frame comprises an inclined portion, the inclined portion facing the recliner in up-down directions and having a top surface inclined such that a height thereof decreases toward an inside in the seat width directions.

6. The vehicle seat according to claim 5, wherein the cushion frame comprises:

a side frame to which the lower arm is fixed; and a reinforcing plate superposed on the side frame in the seat width directions, and wherein the inclined portion is provided on the reinforcing plate.

7. A vehicle seat, comprising:

a seat cushion;

a seatback pivotable relative to the seat cushion in seat front-rear directions;

a cushion frame supporting the seat cushion;

a back frame supporting the seatback;

a lower arm fixed to the cushion frame; and a recliner coupled to the back frame and to the lower arm and configured to cause the back frame to pivot relative to the lower arm in the seat front-rear directions, wherein the lower arm comprises a recliner plate, to which the recliner is fixed and which is fixed to the cushion frame, wherein the recliner plate comprises:

an impact absorbing hole located in a position lower than a rotational center-axis of the recliner;

a first bead extending from the impact absorbing hole to a seat rear side and curved so as to protrude along a seat width direction of the recliner plate in a first protruding direction; and a second bead extending from the impact absorbing hole to a seat front side and curved so as to protrude along the seat width direction of the recliner plate in a second protruding direction, wherein the second protruding direction is opposite to the first protruding direction, wherein, as viewed from a direction parallel to the rotational center-axis of the recliner, a longitudinal direction of the first bead intersects a longitudinal direction of the second bead at an intersection, and the intersection is within the impact absorbing hole.

* * * * *